(12) United States Patent
Broussard et al.

(10) Patent No.: US 11,947,476 B2
(45) Date of Patent: Apr. 2, 2024

(54) CROSS-CHIPLET PERFORMANCE DATA STREAMING

(71) Applicant: Advanced Micro Devices, Inc., Santa Clara, CA (US)

(72) Inventors: Bryan Broussard, Austin, TX (US); Pravesh Gupta, Bangalore (IN); Benjamin Tsien, Santa Clara, CA (US); Vydhyanathan Kalyanasundharam, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/710,413

(22) Filed: Mar. 31, 2022

(65) Prior Publication Data

US 2023/0315657 A1    Oct. 5, 2023

(51) Int. Cl.
*G06F 13/20*    (2006.01)
(52) U.S. Cl.
CPC .......... *G06F 13/20* (2013.01); *G06F 2213/40* (2013.01)
(58) Field of Classification Search
CPC .... H04L 1/1854; H04L 67/565; H04L 69/163
See application file for complete search history.

(56) References Cited

U.S. PATENT DOCUMENTS

| | | | |
|---|---|---|---|
| 10,006,964 B2 | 6/2018 | Charlebois et al. | |
| 11,100,028 B1* | 8/2021 | Subramaniam | G06F 13/4221 |
| 11,294,848 B1* | 4/2022 | Walker | G06F 13/423 |
| 11,403,255 B1* | 8/2022 | Masters | G06F 15/8007 |
| 2009/0089554 A1 | 4/2009 | Blackmon et al. | |
| 2011/0320744 A1 | 12/2011 | Ambroladze et al. | |
| 2015/0356034 A1 | 12/2015 | Pamley et al. | |
| 2021/0256654 A1 | 8/2021 | Koker et al. | |
| 2022/0413593 A1* | 12/2022 | Kakkireni | G06F 1/28 |
| 2023/0046542 A1* | 2/2023 | Narala | G06F 1/3206 |

* cited by examiner

*Primary Examiner* — Getente A Yimer
(74) *Attorney, Agent, or Firm* — Volpe Koenig (57) ABSTRACT

Methods and systems are disclosed for cross-chiplet performance data streaming. Techniques disclosed include accumulating, by a subservient chiplet, event data associated with an event indicative of a performance aspect of the subservient chiplet; sending, by the subservient chiplet, the event data over a chiplet bus to a master chiplet; and adding, by the master chiplet, the received event data to an event record, the event record containing previously received, from the subservient chiplet over the chiplet bus, event data associated with the event.

18 Claims, 5 Drawing Sheets

CROSS-CHIPLET PERFORMANCE DATA STREAMING

BACKGROUND

Performance of a chiplet is typically measured by diagnostic programs that collect and analyze performance data generated during a time the chiplet is employed at a workload of interest. Dedicated circuitry in the chiplet is designed to detect performance related events and to monitor the occurrence rates of these events. Hence, during a monitoring phase, the circuitry of a chiplet can be configured to execute a certain workload. During such execution, the occurrences of performance related events are recorded and stored in memory. These stored records can then be postprocessed to provide insights for the chiplet's behavior under the workload. Since collecting diagnostic data is performed concurrently with other operations executing on the chiplet, the resources consumed by it should be limited. Moreover, the recording of the collected data requires access to memory. In a package layout containing multiple chiplets, not all chiplets have access to memory, and thus recording of diagnostic data may be limited to only some of the chiplets.

BRIEF DESCRIPTION OF THE DRAWINGS

A more detailed understanding may be had from the following description, given by way of example in conjunction with the accompanying drawings wherein.

DETAILED DESCRIPTION

Systems and methods are provided to collect and record diagnostic data (including performance profiling) across a system of chiplets. As disclosed herein, chiplets that do not have access to DRAM (namely, subservient chiplets) are configured to stream, via a chiplet bus, diagnostic data they collect to a chiplet that does have access to DRAM (namely, a master chiplet), through which the formers' diagnostic data are stored in the DRAM. Hence, a subservient chiplet's event data (including counting of the occurrences of an event in the subservient chiplet during multiple time periods) are packed into respective event data packets and are sent over the chiplet bus to a master chiplet. The master chiplet is configured to aggregate the received event data packets in an event record and to store the event record in the DRAM. Given a large number of events, occurring in multiple subservient chiplets, event data packets, sent by the subservient chiplets for each tracked event, may consume a large portion of the available bandwidth on the chiplet bus. As disclosed herein, such bandwidth consumption can be limited by dynamically controlling the frequency in which each subservient chiplet can send event data packets over the chiplet bus.

Aspects of the present disclosure describe methods for cross-chiplet performance data streaming. The methods comprise accumulating, by a subservient chiplet, event data. The event data are associated with an event indicative of a performance aspect of the subservient chiplet. The methods further comprise sending, by the subservient chiplet, the event data over a chiplet bus to a master chiplet, receiving, by the master chiplet, the event data from the subservient chiplet, and adding, by the master chiplet, the received event data to an event record. The event record contains previously received, from the subservient chiplet over the chiplet bus, event data associated with the event.

Aspects of the present disclosure also describe systems for cross-chiplet performance data streaming. The systems comprise at least one processor and memory storing instructions. The instructions, when executed by the at least one processor, cause the system to accumulate, by a subservient chiplet, event data. The event data are associated with an event indicative of a performance aspect of the subservient chiplet. The instructions further cause the system to send, by the subservient chiplet, the event data over a chiplet bus to a master chiplet, to receive, by the master chiplet, the event data from the subservient chiplet, and to add, by the master chiplet, the received event data to an event record. The event record contains previously received, from the subservient chiplet over the chiplet bus, event data associated with the event.

Further, aspects of the present disclosure describe a non-transitory computer-readable medium comprising instructions executable by at least one processor to perform methods for cross-chiplet performance data streaming. The methods comprise accumulating, by a subservient chiplet, event data. The event data are associated with an event indicative of a performance aspect of the subservient chiplet. The methods further comprise sending, by the subservient chiplet, the event data over a chiplet bus to a master chiplet, receiving, by the master chiplet, the event data from the subservient chiplet, and adding, by the master chiplet, the received event data to an event record. The event record contains previously received, from the subservient chiplet over the chiplet bus, event data associated with the event.

Figure 1:
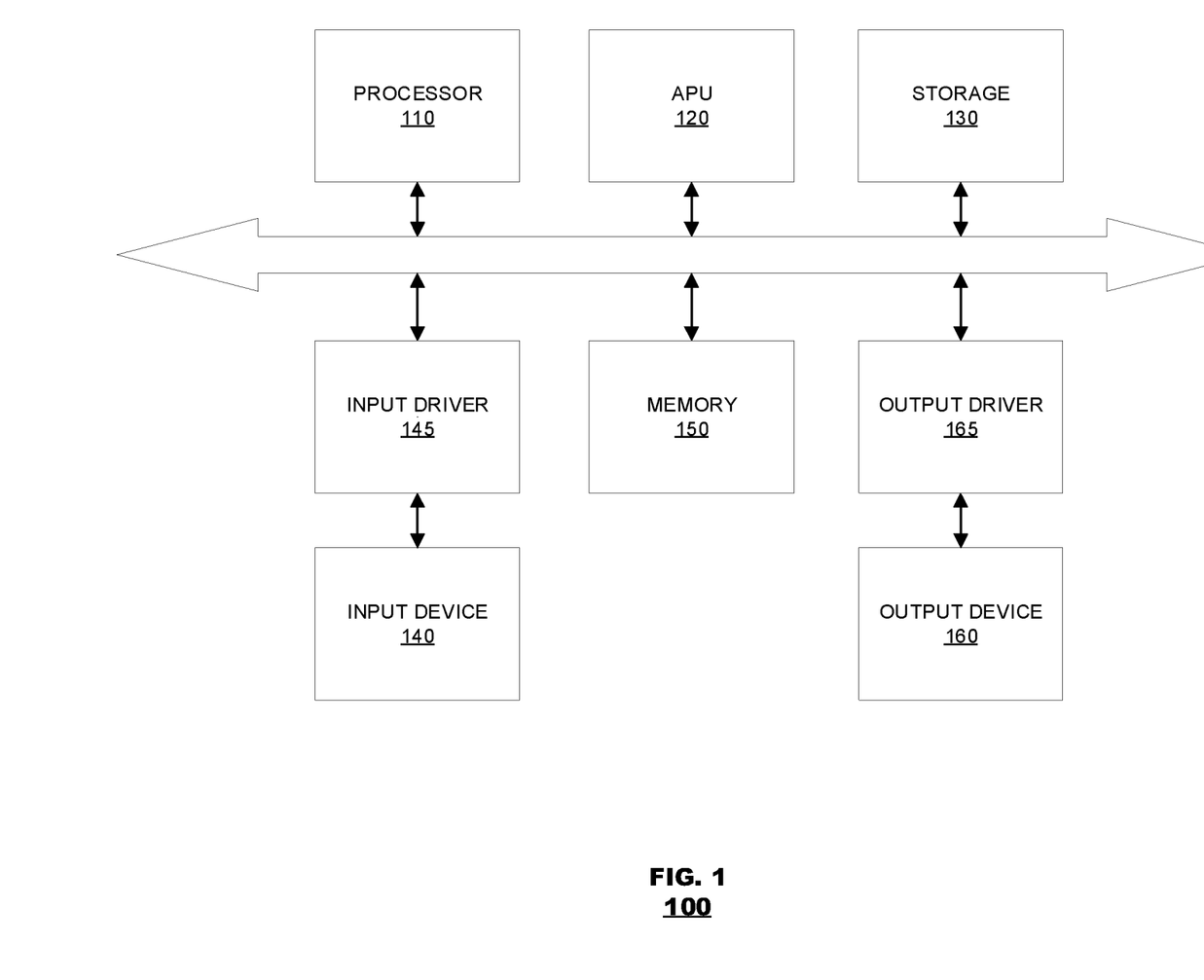
FIG. 1 is a block diagram of an example system, based on which one or more features of the disclosure can be implemented.

FIG. 1 is a block diagram of an example system 100, based on which one or more features of the disclosure can be implemented. The system 100 can be associated with, for example, a computer, a gaming device, a handheld device, a set-top box, a television, a mobile phone, or a tablet computer. The system 100 can include a processor 110, an accelerated processing unit (APU) 120, storage 130, an input device 140, memory 150, and an output device 160. The system 100 can also include an input driver 145 and an output driver 165. The processor 110 and the APU 120 can represent one or more cores of central processing units (CPUs) and one or more cores of APUs, respectively. The memory 150 can represent volatile or non-volatile memory, including random-access memory (RAM), SRAM, dynamic random-access (DRAM), a cache, or a combination thereof. The processor 110, the APU 120, and the memory 150, or a subset thereof, may be located on the same die or on separate dies. In an aspect, the system 100 can include additional components not shown in FIG. 1.

The APU 120 can represent a graphics processing unit (GPU), that is, a shader system comprising one or more computing units that are configured to perform computations in parallel, for example, in accordance with a single instruction multiple data (SIMD) paradigm. The APU 120 can be configured to accept compute commands and graphics rendering commands from the processor 110, to process those compute and graphics rendering commands, and/or to provide output to a display (the output device 160). In alternative aspects, the APU 120 can be employed to perform signal processing operations (e.g., when embodied in a digital signal processor (DSP)), to perform accelerated operations through the use of a field programmable gate array (FPGA) configured by a bitstream, to perform neural processing operations through the use of a neural processing unit (NPU), or to perform other operations that may be more efficiently performed through the use of an accelerated processing unit rather than by processor 110.

The storage 130 can include fixed or removable storage, for example, a hard disk drive, a solid-state drive, an optical disk, or a flash drive. The input device 140 can represent, for example, a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output device 160 can represent, for example, a display, a speaker, a printer, a haptic feedback device, one or more lights, an antenna, or a network connection (e.g., a wireless local area network card for transmission of wireless IEEE 802 signals). In an aspect, the input driver 145 communicates with the processor 110 (or the APU 120) and the input device 140, and facilitates the receiving of input from the input device 140 to the processor 110 (or the APU 120). In another aspect, the output driver 165 communicates with the processor 110 (or the APU 120) and the output device 160, and facilitates the sending of output from the processor 110 (or the APU 120) to the output device 160.

Figure 2:
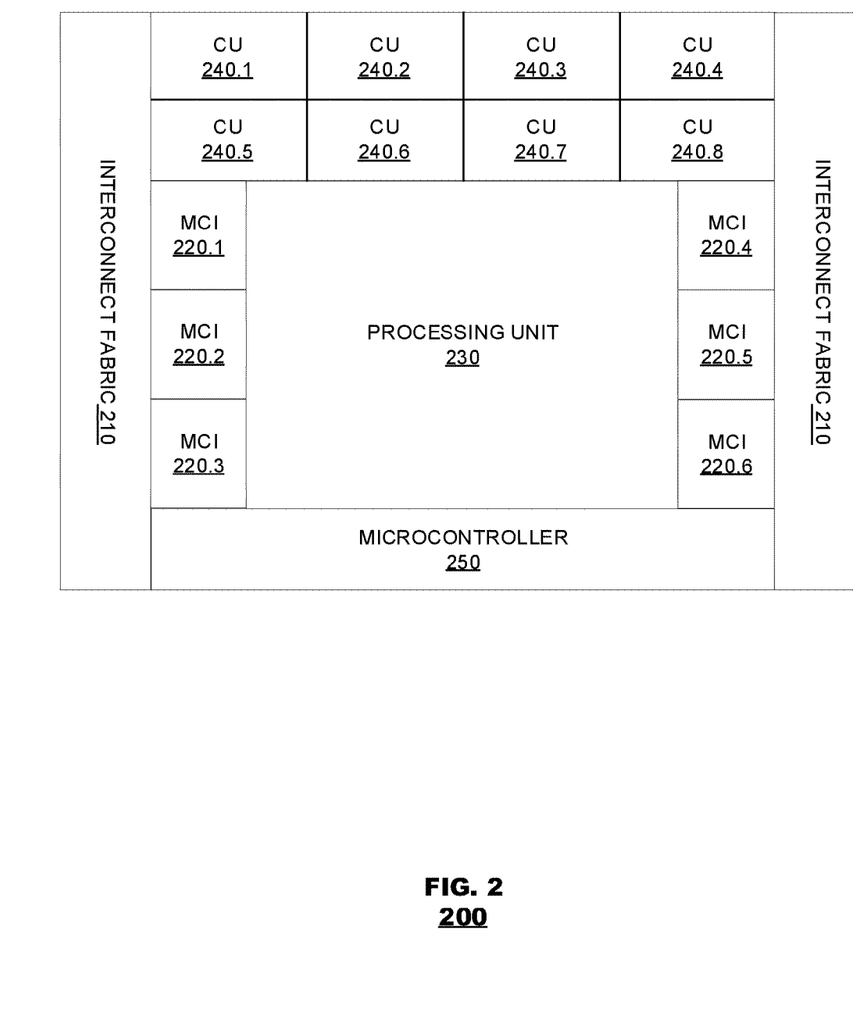
FIG. 2 is a diagram of an example device, constructed of multiple chiplets in a package layout, based on which one or more features of the disclosure can be implemented.

FIG. 2 is a diagram of an example device, constructed of multiple chiplets in a package layout 200, based on which one or more features of the disclosure can be implemented. The package layout 200 can contain chiplets that are parts of an APU (e.g., the APU 120 of FIG. 1). For example, the package layout 200 can include a processing unit chiplet 230, computing unit (CU) chiplets 240.1-8, memory channel interface (MCI) chiplets 220.1-6, and a microcontroller 250. The processing unit chiplet 230 may be employed by a host (e.g., the processor 110 of FIG. 1) to carry out computational tasks associated with rendering of graphics or any other multidimensional data processing. The computing unit chiplets 240.1-8 can each include SIMD cores that can be scheduled by the processing unit 230 to perform the computational tasks. The MCI chiplets 220.1-6 can be used by other chiplets, such as the processing unit 230, to access the DRAM (e.g., the memory 150 of FIG. 1) via a communication link, such as an interconnect fabric 210.

By design, some chiplets can access the DRAM via the interconnect fabric 210 (to read or write data they use or generate, respectively) and some chiplets do not have access the DRAM. For example, the MCI 220.1-6 chiplets, although designed to facilitate other chiplets (e.g., the processing unit 230) with reading and writing access to the DRAM, cannot store in the DRAM data generated by their own circuitry. Not being able to store such data presents a problem when performance related information has to be collected from a chiplet and be stored for later analyses of that chiplet's performance. For example, in the case of an MCI chiplet, e.g., 220.1, it may be desired to monitor the performance of a cache system that interfaces with a memory channel of the DRAM. In such a case, performance related events—such as hit events or miss events—should be tracked and recorded. Thus, a chiplet's capability to store its own generated data is instrumental for at least diagnostic purposes.

To monitor various chiplet performance aspects, a diagnostic program (e.g., executing on a host 110 and/or a chiplet, such the microcontroller 250, for example) can be applied to track the occurrences of performance related events in a chiplet when the chiplet is employed to perform a certain workload. Thus, such a diagnostic program can test various performance aspects while stressing the system of chiplets 200 with different workloads. The rate in which a performance related event occurs in a chiplet can be recorded and can be used (possibly together with the recorded rates of other performance related events), for example, to measure the performance of the chiplet or the system 200 as a whole. The performance monitoring of chiplets with access to DRAM and chiplets without access to DRAM is further discussed in reference to FIG. 3.

Figure 3:
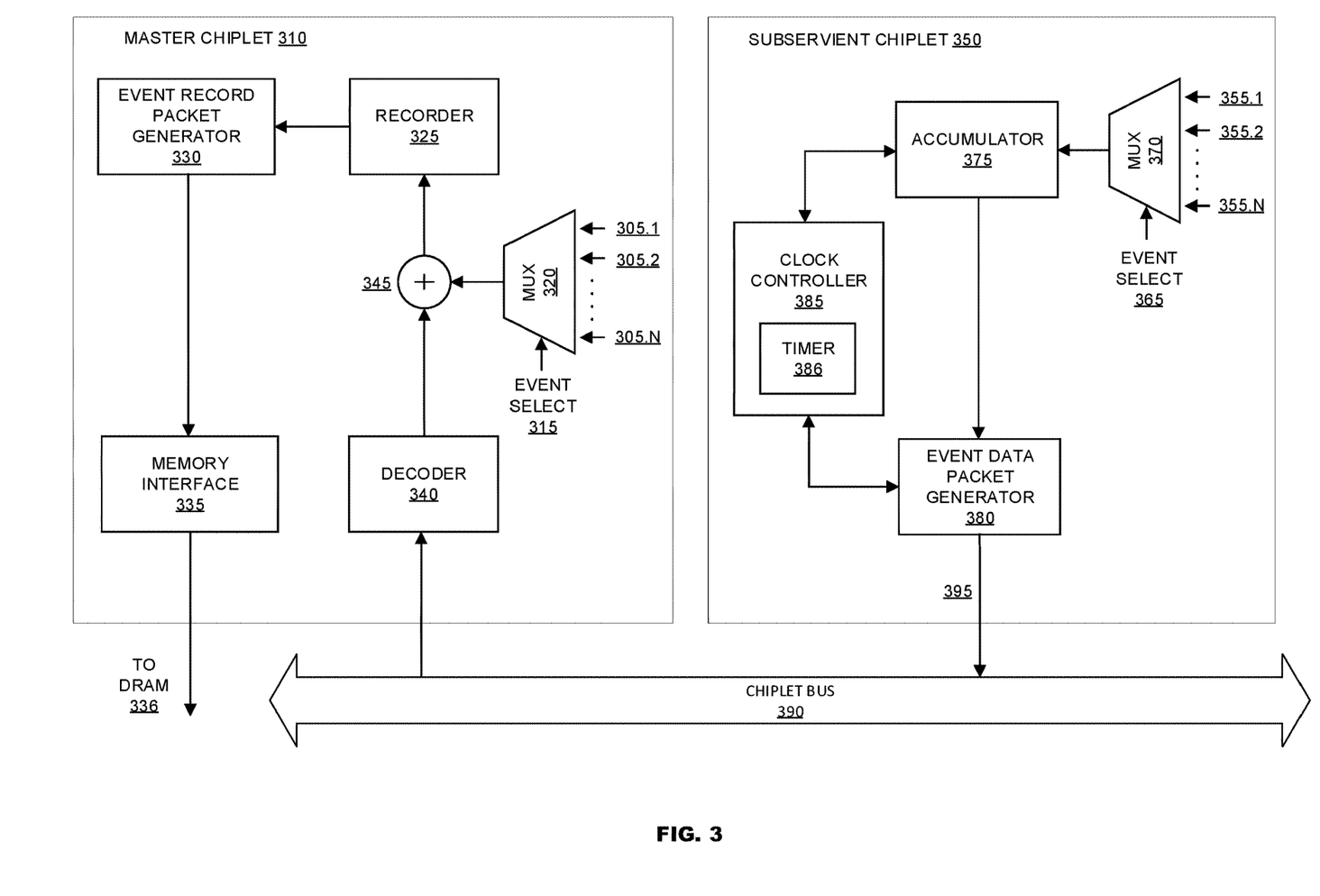
FIG. 3 is a block diagram of an example master chiplet and an example subservient chiplet, illustrating cross-chiplet performance data streaming, based on which one or more features of the disclosure can be implemented.

FIG. 3 is a block diagram of an example master chiplet and an example subservient chiplet, illustrating cross-chiplet performance data streaming, based on which one or more features of the disclosure can be implemented. FIG. 3 shows a master chiplet 310, representative of a chiplet with access to the DRAM (such as the processing unit 230 of FIG. 2), and a subservient chiplet 350, representative of a chiplet without access to DRAM (such as one of the MCI chiplets 220.1-6 of FIG. 2). The master and subservient chiplets 310, 350 are communicatively connected via a chiplet bus 390, as are other chiplets in the package layout 200. As disclosed herein, both chiplets 310, 350 are configured to support performance monitoring by generating data associated with performance related events. However, while the master chiplet 310 can access the DRAM 336 to store performance related data (to allow for performance analyses), the subservient chiplet 350 has no such access. Therefore, as disclosed herein, performance related data that are generated by the subservient chiplet 350 are stored in the DRAM via the master chiplet 310.

The master chiplet 310 includes circuitry that facilitates performance monitoring carried out by a diagnostic program, driven by logic circuitry of the microcontroller 250, for example. The master chiplet 310 includes a multiplexer 320, a recorder 325, an event record packet generator 330, a memory interface 335, and a decoder 340. Various circuitry in the master chiplet 310 are configured to alert each time a performance related event occurs. For example, logic associated with a cache system can be configured to generate an event signal each time a hit-event occurs in the cache system. Such an event signal, e.g., 305.1, together with other types of event signals 305.2-N that indicate the occurrence of other performance related events in the master chiplet (such as, a miss-event or a branch mis-prediction event), are fed into the multiplexer 320. Depending on the performance aspect being monitored, an event can be programmatically selected 315 to be tracked by the diagnostic program. For example, the event that corresponds to event signal 305.1 can be selected, so that each time such a selected event occurs, a generated event signal 305.1 is channeled via the multiplexer 320 to the recorder 325, causing a corresponding event record to be updated. Thus, the recorder 325 contains event records, including the occurrences of respective events and, possibly, other information associated with the respective events. For example, the recorder can include 16 counters (e.g., each of which can be implemented by a 48-bit register) that are employed to record the occurrences of corresponding events.

Hence, in a monitoring phase during which a performance aspect relative to a certain workload can be tested, the diagnostic program can programmatically select 315 an event associated with the performance aspect being tested. The diagnostic program can further programmatically select a corresponding counter in which occurrences of the selected event are counted, that is, the occurrences of the selected event are recorded in a respective event record. The event record packet generator 330 is configured to capture event records from the recorder 325 and pack these records into corresponding event record packets. The packed event records are then sent to the memory interface 335 through which the event record packets are stored in the DRAM 336. The event record packet generator 330 can be trigged to capture each event record from the recorder 325 periodically or each time a corresponding counter of the recorder 325 is close to becoming saturated (e.g., reaching a saturation threshold, such as one associated with a 90% saturation level). Once an event record is captured by the event record packet generator 330, the corresponding counter in the recorder 325 can be reset.

The subservient chiplet 350 also includes circuitry that facilitates performance monitoring carried out by the diagnostic program. However, in this case, recording of event occurrences is accomplished via a chiplet with access to the DRAM, that is, the master chiplet 310. The subservient chiplet 350 includes a multiplexer 370, accumulator 375, a clock controller 385, and an event data packet generator 380. Similar to the master chiplet 310, various circuitry in the subservient chiplet 350 are configured to alert each time a performance related event occurs. When performance related events occur, respective logics in the subservient chiplet 350 generate event signals 355.1-N that are fed into the multiplexer 370. Depending on the performance aspect being monitored, an event can be programmatically selected 365 by the diagnostic program to be tracked. Thus, each time such an event occurs, an event signal, e.g., 355.1, is generated and channeled via the multiplexer 370 to the accumulator 375, causing a corresponding event data in the accumulator 375 to be updated. Thus, the accumulator 375 contains event data, including the occurrences of respective events and, possibly, other information associated with respective events. For example, the accumulator 375 can include 16 counters (e.g., each of which can be implemented by a 12-bit register) that are employed to record the occurrences of corresponding events. Hence, in a monitoring phase, the diagnostic program can programmatically select 365 an event (associated with a performance aspect being tested) and a corresponding counter (from the accumulator 375) in which occurrences of the selected event are counted.

Event data of the accumulator 375, can be captured and packed into event data packets by the event data packet generator 380. These event data packets are then sent over the chiplet bus 390 to the master chiplet 310. The event data packet generator 380 can be trigged to capture event data from the accumulator 375 periodically or each time a respective counter in the accumulator 325 is close to becoming saturated (e.g., reaching a saturation threshold, such as one associated with a 90% saturation level). For example, when one or more counters in the accumulator 325 are close to becoming saturated, the accumulator can signal the clock controller 385 that event data corresponding to one or more of its counters are ready to be captured. In response, the clock controller can send a clock signal to both the accumulator 375 and the event data packet generator 380 to trigger the capturing of the event data corresponding to the one or more counters and the packing of the captured data in respective event data packets. Once event data are captured by the event data packet generator 380, the corresponding counter in the accumulator 375 can be reset.

In an aspect, two counters, A and B, of the accumulator 375 may be set to count events that are signaled by event signals 355.1 and 355.2, respectively. Once one of these counters reaches a saturation threshold (e.g., the counter reaches 90% of its counting capacity), a respective saturation flag in the accumulator 375 can be turned on. In response to a saturation flag being turned on, the accumulator 375 can signal the clock controller 385 to schedule the capturing of respective event data corresponding to counters A and B. Upon the receipt of such a signal, the clock controller 385 can send a clock signal that initiates the process of capturing the event data corresponding to these counters and packing the captured event data into one or more packets. For example, a 32-bit packet format may be used, where bits 0-3 record an identity number associated with a first event, bits 4-15 record the event data of the first event (e.g., accumulated occurrences of the first event counted by counter A), bits 16-19 record an identity number associated with a second event, bits 20-31 record the event data of the second event (e.g., accumulated occurrences of the second event counted by counter B). Once respective event data corresponding to counters A and B have been captured and packed, as described above, the accumulator 375 can reset these counters, and counting in counters A and B starts again from zero.

Hence, accumulated occurrences of events (occurred during the operation of respective circuitry in a subservient chiplet 350), recorded in respective counters, as described above, are captured and packed by the event data packet generator 380 and then sent over the chiplet bus 390 to the decoder 340 of the master chiplet 310. The decoder 340 is configured to decode the received event packets. Applying the 32-bit packet format described above, the decoder can map the event data (e.g., data that represent the number of accumulated occurrences of a first event) stored in bits 4-15 to a first counter in the recorder 325, identified based on the identity number (associated with the first event) stored in bits 0-3. Likewise, the decoder can map the event data (e.g., data that represent the number of accumulated occurrences of a second event) stored in bits 20-31 to a second counter in the recorder 325, identified based on the identity number (associated with the second event) stored in bits 16-19. Hence, event data associated with the first event that are received over the chiplet bus in an event data packet are added to previously received event data associated with the first event. Likewise, event data associated with the second event that are received over the chiplet bus in an event data packet are added to previously received event data associated with the second event. Thus, the recorder 325 can record occurrences of remote events (events occurring in the subservient chiplet 350) in its first and second counters, for example, and the occurrences of local events (events occurring in the master chiplets 310) in its other counters.

To accurately identify shortcomings across circuitry of chiplets, chiplets 310, 350 are designed to generate hundreds of event signals, the detection of which adds to the complexity of the performance monitoring process. Moreover, the large number of event signals generated by the subservient chiplets 350 leads to the submission of a large number of event data packets to the master chiplet 310, as described above, that in turn can consume a significant portion of the bandwidth available on the chiplet bus 390. As, typically, the chiplet bus is designed for other control and data traffic among chiplets in the package layout 200, the extra bandwidth consumed by those event packets should be balanced against the need to frequently update event records in the DRAM. That is, there is a tradeoff between the need to limit bandwidth utilization on the chiplet bus 390 and the need to reduce the latency associated with the update frequency of the event records in the DRAM that are used for performance analyses.

One way to limit bandwidth consumption can be by reducing the size of each message. As described above, a 32-bit packet format can be used to encode data associated with a pair of events. With respect to one event of the pair, for example, the event data and an identity number associated with the event can be encoded in 16 bits. The identity number associated with the event can be used to map the event to a counter in the recorder 325. Accordingly, each of the 16 counters in the recorder 325 can be specified by 4 bits. That leaves 12 bits to represent the event data. Thus, the counters in the accumulator 375 can be used to count up to 4,096 occurrences of a respective event. When a counter reaches that limit (to prevent saturation) it should be reset after its content is captured, as described in reference to FIG. 4.

Another way to limit bandwidth consumption is by controlling the frequency in which event data packets are sent. To that end, a programmable timer 386 can be used to strike a balance between low bandwidth consumption and low latency. The timer 386 can be set to a period value, for example, programmatically and dynamically set by the diagnostic program. The timer's period value determines the time periods between successive messages of event data packets (that is, the frequency in which these messages are sent over the chiplet bus 390). In an aspect, each time the event data packet generator 380 sends an event data packet message 395 over the chiplet bus 390, it 380 can send a signal to the clock controller 385 to trigger the resetting of the timer 386 to the period value. The timer 386 can then be decremented, by the clock controller 386, using a reference clock. Accordingly, event data packet messages 395 are sent from the subservient chiplet 350 over the chiplet bus 390: 1) when any of the counters of the accumulator are close to saturation; or 2) when the timer 386 expires.

Bandwidth consumption is also affected by the number of subservient chiplets 350 that are concurrently streaming their respective event data packet messages over the chiplet bus 390 to the master chiplet 310. In an aspect, the period values of timers 386 in respective chiplets 350 can be dynamically set according to the currently available bandwidth on the chiplet bus 390. For example, the available bandwidth can be shared among the streams of the subservient chiplets 350. In another example, some subservient chiplets may be prioritized over other subservient chiplets 350, and, thus, the formers' timers can be set to have shorter period values than the timers of the latter. Hence, by measuring the current available bandwidth on the chiplet bus 390, a diagnostic program, for example, can dynamically set the period values of timers 386 in respective subservient chiplets to control (or bound) the overall bandwidth used by these chiplets during a monitoring phase.

Figure 4:
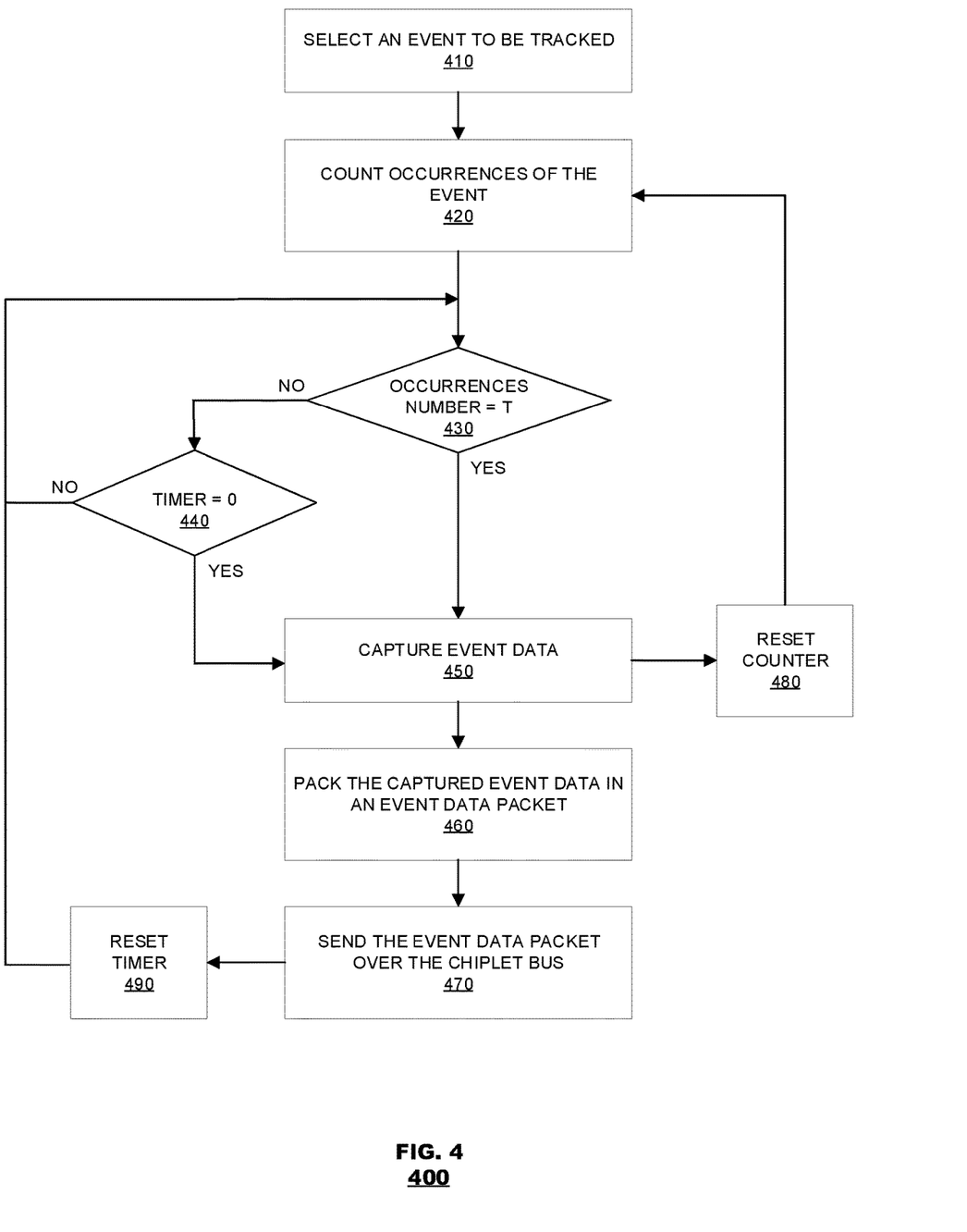
FIG. 4 is a flowchart of an example method for performance data streaming from a subservient chiplet, based on which one or more features of the disclosure can be implemented.

FIG. 4 is a flowchart of an example method 400 for performance data streaming from a subservient chiplet, based on which one or more features of the disclosure can be implemented. The method 400 begins, in step 410, with selecting an event to be tracked in a monitoring phase. In step 420, the occurrences of the selected event in the subservient chiplet 350 are counted. These event occurrences can be counted by a counter of the accumulator 375. The counting can proceed until it reaches a saturation threshold T. The saturation threshold is set relative to the counting capacity of the counter (e.g., 4,096 for a 12-bit counter). Thus, in step 430, if the counting of occurrences reaches the saturation threshold, the method 400 proceeds to step 440. In step 440, if the timer 386 expires, the method 400 proceeds to step 450. As explained above, to control bandwidth consumption, the timer 386 is set to a period value that determines the frequency in which messages of event data packets are sent via the chiplet bus 390. In step 450, event data associated with the selected event are captured from the accumulator 375. The event data include a counting value captured from the counter, representing the accumulated number of occurrences of the selected event. Once the event data are captured 450, the counter can be reset 480 and counting of further occurrences of the selected event can be continued 420. In step 460, the captured event data are packed into an event data packet. In an aspect, two selected events and their corresponding event data can be packed into a 32-bit packet format, as described above. Then, in step 470, the event data packet is sent over the chiplet bus 390 to the master chiplet 310. The timer is then reset 490 to a time period value, at the expiration of which the next submission of an event data packet 470 takes place.

Figure 5:
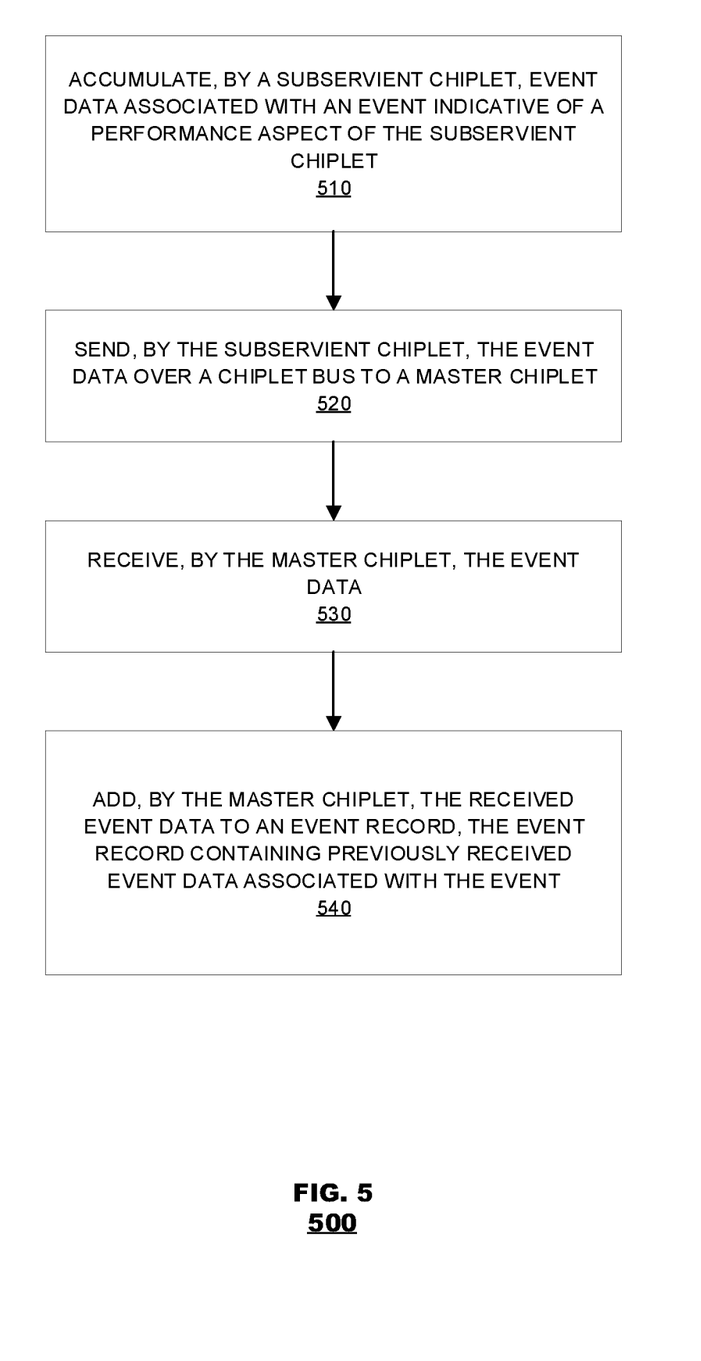
FIG. 5 is a flowchart of an example method for cross-chiplet performance data streaming, based on which one or more features of the disclosure can be implemented.

FIG. 5 is a flowchart of an example method 500 for cross-chiplet performance data streaming, based on which one or more features of the disclosure can be implemented. The method 500 begins, in step 510, with accumulating, by the subservient chiplet 350, event data. The event data are associated with an event that indicates a performance aspect of the subservient chiplet 350. Then, in step 520, the subservient chiplet 350 sends the event data over the chiplet bus 390 to the master chiplet 310. As disclosed herein, sending event data over the chiplet bus 390 can be performed periodically according to a period that can be dynamically determined based on the available bandwidth on the chiplet bus 390. The master chiplet 310, in step 530, receives the event data, and, then, in step 540, adds the received event data to an event record. This event record contains previously received (from the subservient chiplet 350 over the chiplet bus 390) event data associated with the event. The master chiplet 310 is configured to store the event record in the DRAM 336 for further performance processing.

In an aspect, the steps of method 500 can be applied to additional subservient chiplets. For example, the steps of method 500 can be applied to a first and to a second subservient chiplets 350, for each an event is selected to be tracked. In this case, event data received from the first subservient chiplet 350 can be added to a first event record in the master chiplet 310. This first event record contains previously received, from the first subservient chiplet over the chiplet bus, event data associated with the first event. Likewise, event data received from the second subservient chiplet 350 can be added to a second event record in the master chiplet 310. This second event record contains previously received, from the second subservient chiplet over the chiplet bus, event data associated with the second event. Sending respective event data by multiple subservient chiplets 350 over the chiplet bus 390 can be performed periodically according to respective periods that can be dynamically determined based on available bandwidth on the chiplet bus 390.

In another aspect, the master chiplet 310 can be configured to record, into a third event record, event data associated with a third event. This third event indicates a performance aspect of the master chiplet. The master chiplet can be further configured to store in the DRAM 336 the third event record together with event records that contain event data received over the chiplet bus 390 from respective multiple subservient chiplets 350.

It should be understood that many variations are possible based on the disclosure herein. Although features and elements are described above in particular combinations, each feature or element can be used alone without the other features and elements or in various combinations with or without other features and elements. Additionally, it should be understood that the herein usage of "subservient" and "master" qualifiers to chiplets is merely a naming scheme that meant to indicate, in the context of this disclosure, that a first chiplet (qualified as a master) does have access to memory while a second chiplet (qualified as a subservient) does not have access to memory. However, such naming scheme is not meant to otherwise limit or characterize the relationship between the first and second chiplets.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be mask works that are then used in semiconductor manufacturing processes to manufacture processors that implement aspects of the embodiments.

The methods or flowcharts provided herein can be implemented in a computer program, software, or firmware incorporated in a non-transitory computer-readable storage medium for execution by a general-purpose computer or processor. Examples of non-transitory computer-readable media include read only memory (ROM), random-access memory (RAM), a register, cache memory, semiconductor memory devices, magnetic media such as internal hard drive and disks and removable disks, magneto-optical media, and optical media such as CD-ROM disks, and digital versatile disks (DVDs).

What is claimed is:

1. A method for cross-chiplet performance data streaming, comprising:
   accumulating, by a first subservient chiplet, first event data associated with a first event indicative of a performance aspect of the first subservient chiplet;
   sending, by the first subservient chiplet, the first event data over a chiplet bus to a master chiplet;
   receiving, by the master chiplet, the first event data from the first subservient chiplet;
   adding, by the master chiplet, the received first event data to a first event record, the first event record containing event data associated with the first event and previously received from the first subservient chiplet over the chiplet bus;
   storing, by the master chiplet, the event record, in a memory;
   accumulating, by a second subservient chiplet, second event data associated with a second event indicative of a performance aspect of the second subservient chiplet;
   sending, by the second subservient chiplet, the second event data over the chiplet bus to the master chiplet;
   receiving, by the master chiplet, the second event data from the second subservient chiplet; and
   adding, by the master chiplet, the received second event data to a second event record, the second event record containing event data associated with the second event and previously received from the second subservient chiplet over the chiplet bus.

2. The method of claim 1, wherein the accumulating by the first subservient chiplet comprises:
   counting, by an accumulator of the first subservient chiplet, occurrences of the first event, wherein the first event data include a number of the counting.

3. The method of claim 2, wherein the sending by the first subservient chiplet is performed when the number of the counting is above a saturation threshold.

4. The method of claim 1, wherein the sending by the first subservient chiplet is performed periodically according to a period that is dynamically determined based on available bandwidth on the chiplet bus.

5. The method of claim 1, wherein the sending by the first subservient chiplet comprises:
   capturing, from an accumulator of the first subservient chiplet, the first event data;
   resetting the accumulator; and
   packing, into an event data packet, the first event data and an identity number associated with the first event.

6. The method of claim 5, wherein the receiving the first event data comprises:
   receiving the event data packet;
   extracting, by a decoder of the master chiplet, from the received event data packet, the first event data and the identity number associated with the first event; and
   selecting, based on the identity number, the first event record in a recorder of the master chiplet.

7. The method of claim 1, wherein the sending of respective event data by the first subservient chiplet and the sending of respective event data by the second subservient chiplet over the chiplet bus is performed periodically according to respective periods that are dynamically determined based on an available bandwidth on the chiplet bus.

8. The method of claim 1, further comprising:
   recording, by the master chiplet, into a third event record, event data associated with a third event indicative of a performance aspect of the master chiplet.

9. The method of claim 8, further comprising:
   storing, by the master chiplet, the first event record and the third event record in the memory.

10. A system for cross-chiplet performance data streaming, comprising:
    at least one processor; and
    memory storing instructions that, when executed by the at least one processor, cause the system to:
      accumulate, by a first subservient chiplet, first event data associated with a first event indicative of a performance aspect of the first subservient chiplet,
      send, by the first subservient chiplet, the first event data over a chiplet bus to a master chiplet,
      receive, by the master chiplet, the first event data from the first subservient chiplet,
      add, by the master chiplet, the received first event data to a first event record, the first event record containing event data associated with the first event and previously received from the first subservient chiplet over the chiplet bus;

store, by the master chiplet, the event record, in a memory;

accumulate, by a second subservient chiplet, second event data associated with a second event indicative of a performance aspect of the second subservient chiplet;

send, by the second subservient chiplet, the second event data over the chiplet bus to the master chiplet;

receive, by the master chiplet, the second event data from the second subservient chiplet; and add, by the master chiplet, the received second event data to a second event record, the second event record containing event data associated with the second event and previously received from the second subservient chiplet over the chiplet bus.

11. The system of claim 10, wherein the accumulating by the first subservient chiplet comprises:

counting, by an accumulator of the first subservient chiplet, occurrences of the first event, wherein the first event data include a number of the counting.

12. The system of claim 11, wherein the sending by the first subservient chiplet is performed when the number of the counting is above a saturation threshold.

13. The system of claim 10, wherein the sending by the first subservient chiplet is performed periodically according to a period that is dynamically determined based on available bandwidth on the chiplet bus.

14. The system of claim 10, wherein the sending of respective event data by the first subservient chiplet and the sending of respective event data by the second subservient chiplet over the chiplet bus is performed periodically according to respective periods that are dynamically determined based on an available bandwidth on the chiplet bus.

15. The system of claim 10, wherein the instructions further causing the system to:

record, by the master chiplet, into a third event record, event data associated with a third event indicative of a performance aspect of the master chiplet.

16. A non-transitory computer-readable medium comprising instructions executable by at least one processor to perform a method for cross-chiplet performance data streaming, the method comprising:

accumulating, by a first subservient chiplet, first event data associated with a first event indicative of a performance aspect of the first subservient chiplet;

sending, by the first subservient chiplet, the first event data over a chiplet bus to a master chiplet;

receiving, by the master chiplet, the first event data from the first subservient chiplet;

adding, by the master chiplet, the received first event data to a first event record, the first event record containing event data associated with the first event and previously received from the first subservient chiplet over the chiplet bus;

storing, by the master chiplet, the event record, in a memory;

accumulating, by a second subservient chiplet, second event data associated with a second event indicative of a performance aspect of the second subservient chiplet;

sending, by the second subservient chiplet, the second event data over the chiplet bus to the master chiplet;

receiving, by the master chiplet, the second event data from the second subservient chiplet; and adding, by the master chiplet, the received second event data to a second event record, the second event record containing event data associated with the second event and previously received from the second subservient chiplet over the chiplet bus.

17. The non-transitory computer-readable medium of claim 16, wherein the accumulating by the first subservient chiplet comprises:

counting, by an accumulator of the first subservient chiplet, occurrences of the first event, wherein the first event data include a number of the counting, wherein the first subservient chiplet does not have access to the memory.

18. The non-transitory computer-readable medium of claim 17, wherein the sending the first event data is performed when the number of the counting is above a saturation threshold, wherein the first subservient chiplet does not have access to the memory.

* * * * *